(12) United States Patent
Boucard (10) Patent No.: US 10,247,839 B2
(45) Date of Patent: *Apr. 2, 2019

(54) SEISMIC DATA ACQUISITION SYSTEM COMPRISING MODULES ASSOCIATED WITH UNITS CONNECTED TO SENSORS, THE MODULES BEING AUTONOMOUS WITH RESPECT TO POWER SUPPLY, SYNCHRONISATION AND STORAGE

(71) Applicant: SERCEL, Carquefou (FR)

(72) Inventor: Daniel Boucard, Thouare sur Loire (FR)

(73) Assignee: SERCEL, Carquefou (FR)

( * ) Notice: Subject to any disclaimer, the term of this patent is extended or adjusted under 35 U.S.C. 154(b) by 179 days.

This patent is subject to a terminal disclaimer.

(21) Appl. No.: 14/844,147

(22) Filed: Sep. 3, 2015

(65) Prior Publication Data
US 2015/0378038 A1 Dec. 31, 2015

Related U.S. Application Data

(63) Continuation of application No. 13/306,107, filed on Nov. 29, 2011, now abandoned, which is a (Continued)

(30) Foreign Application Priority Data

Nov. 25, 2008 (FR) .................. 08 06600

(51) Int. Cl.
*G01V 1/22* (2006.01)
*G01V 1/24* (2006.01)
*G01V 1/00* (2006.01)

(52) U.S. Cl.
CPC ............. *G01V 1/22* (2013.01); *G01V 1/247* (2013.01); *G01V 1/003* (2013.01)

(58) Field of Classification Search
CPC ................. G01V 1/22; G01V 1/247
(Continued)

(56) References Cited

U.S. PATENT DOCUMENTS

| | | |
|---|---|---|
| 5,627,798 A | 5/1997 | Siems et al. |
| 5,724,241 A | 3/1998 | Wood et al. |

(Continued)

FOREIGN PATENT DOCUMENTS

DE 19519164 12/1995

OTHER PUBLICATIONS

French Search Report from French priority application No. FR 08/06600, dated Jul. 24, 2009, 2 pages.

(Continued)

*Primary Examiner* — Ian J Lobo
(74) *Attorney, Agent, or Firm* — Patent Portfolio Builders PLLC (57) ABSTRACT

Described herein is a land seismic data acquisition system comprising a central processing unit; a cabled network connected to the central processing unit comprising a plurality of acquisition lines each comprising: electronic units assembled in series along a telemetry cable and each associated with at least one seismic sensor, the units processing signals transmitted by the sensor(s); intermediate modules assembled in series along the telemetry cable and each associated with at least one of the electronic units, each intermediate module providing power supply and synchronization of the electronic unit(s) wherewith it is associated; wherein each electronic unit is associated with at least two intermediate modules including at least one upstream and at least one downstream from the electronic unit along the telemetry cable, and comprises synchronization means independent from the cabled network, bidirectional and autono- (Continued)

mous power supply means, bidirectional storage means of the signals processed by the electronic units.

20 Claims, 5 Drawing Sheets

Related U.S. Application Data continuation-in-part of application No. 12/626,182, filed on Nov. 25, 2009, now Pat. No. 8,339,899.

(58) Field of Classification Search
USPC .......................................... 367/58, 63, 76, 77
See application file for complete search history.

(56) References Cited

U.S. PATENT DOCUMENTS

| | | | |
|---|---|---|---|
| 6,070,129 | A | 5/2000 | Grouffal et al. |
| 6,672,422 | B2 | 1/2004 | Orban et al. |
| 7,583,560 | B2* | 9/2009 | Chamberlain ........... G01V 1/22 |
| | | | 367/50 |
| 8,339,899 | B2* | 12/2012 | Boucard ................. G01V 1/22 |
| | | | 367/58 |
| 2003/0016587 | A1 | 1/2003 | Wilson et al. |
| 2004/0105533 | A1 | 6/2004 | Iseli |
| 2005/0011403 | A1 | 5/2005 | Ray et al. |
| 2006/0155758 | A1* | 7/2006 | Arnegaard ............... G01V 1/22 |
| 2007/0177459 | A1 | 8/2007 | Behn et al. |
| 2010/0074055 | A1 | 3/2010 | Nemeth et al. |
| 2010/0128564 | A1 | 5/2010 | Boucard |
| 2011/0228885 | A1* | 9/2011 | Lee ........................ G04G 7/023 |
| | | | 375/357 |
| 2012/0082002 | A1 | 4/2012 | Iseli |

OTHER PUBLICATIONS

File History from co-pending, U.S. Appl. No. 12/626,182, filed Nov. 25, 2009, 106 pgs. (downloaded from USPTO webiste Jun. 12, 2012).

Partial File History (from Jun. 21, 2012 on) from co-pending U.S. Appl. No. 12/626,182, now U.S. Pat. No. 8,339,899, 21 pgs. (downloaded from USPTO website Jan. 30, 2013).

* cited by examiner

SEISMIC DATA ACQUISITION SYSTEM COMPRISING MODULES ASSOCIATED WITH UNITS CONNECTED TO SENSORS, THE MODULES BEING AUTONOMOUS WITH RESPECT TO POWER SUPPLY, SYNCHRONISATION AND STORAGE

CROSS-REFERENCE TO RELATED APPLICATIONS

This application is a continuation of U.S. patent application Ser. No. 13/306,107 filed on Nov. 29, 2011 which is a continuation-in-part of U.S. Pat. No. 8,339,899, issued on Dec. 25, 2012, which claims the benefit of French Patent Application No. FR 08/06600, filed on Nov. 25, 2008, the contents of which are hereby incorporated by reference in their entirety.

BACKGROUND OF THE INVENTION

Field of the Invention

The field of the invention is that of seismic data acquisition. More specifically, the invention relates to seismic data acquisition systems comprising a network connected to a central processing unit, for example onboard a vehicle. The invention particularly relates to the seismic prospecting method for oil industry, but may be applied to any field implementing a seismic data acquisition network. However, one particular application of the invention relates to land seismic data acquisition systems.

Background of the Invention

Seismic data acquisition operations in the field conventionally use networks of electronic units whereto ground movement sensors are connected.

These sensors, generally referred to using the term geophones, are generally interconnected in groups of sensors by cables to form clusters referred to as "strings". One or a plurality of these strings are connected to the electronic units. The electronic units, interconnected by a cabled digital network, perform the analog to digital conversion of the signal from the groups of sensors and send these data to the recording truck via the digital network, a central data processing unit being onboard the truck.

Novel systems have recently been introduced on the market wherein the sensors are integrated in the electronic conversion unit, which eliminates the geophone strings. In this case, the sensors are micro-machined accelerometers.

To collect the geophysical data, one or a plurality of seismic sources in contact with the ground are activated to propagate omnidirectional seismic wave trains. The sources may among other things consist of explosives, falling weights, vibrators or air guns in marine environments.

The wave trains reflected by the layers of the subsurface are detected by the sensors, which generate an analog signal characterizing the reflection of the waves on the geological interfaces of the subsurface.

SUMMARY OF THE INVENTION

The invention particularly applies to seismic data acquisition system implementing a cabled network.

In this type of network, the data are conventionally sent from the digital unit to the central processing unit via intermediate electronic modules.

These intermediate electronic modules perform different functions, including:
  power supply of the units via batteries;
  synchronization of the units;
  processing of the signal and the interface with the digital network (transfer of data to the central processing unit, sending of commands received from the central processing unit to the units).

In the current cabled systems, the central processing unit sends a synchronization message to the entire network, this message being repeated by the electronic modules to the units.

For example, the central processing unit may contain a high-precision clock (such as a quartz oscillator), the modules and units optionally being frequency-dependent by means of a phase lock loop (PLL).

The major problem of this type of network is the sensitivity of the system to cable cuts.

In the case of a cabled network, a cable cut causes a loss of connection with the units situated after the cut and therefore the loss of all the seismic measurement points corresponding to these units.

Indeed, the electronic units and modules are devised to only perform signal processing functions. In other words, the electronic units and modules progressively return the seismic data to the central processing unit.

Therefore, a cable cut results in the irremediable loss of the seismic data corresponding to the sensors of the network section isolated by the cut.

These cuts may have various causes:
  passages of animals (rodents, crocodiles, ruminants, etc.);
  vandalism;
  passage of vehicle wheels;
  etc.

It is understood that a cable cut also results in a loss of the synchronization of the modules that rely on the central processing unit; as the seismic signals can no longer be time-stamped and are thus of no use for the end user.

Furthermore, a seismic data acquisition campaign is performed such that the data are collected for all the points of the rolled out network. If data do not reach the central processing unit for some points, the data collected for the other points provide a lower quality "seismic image". As a result, a cable cut tending to only isolate some points of the network impacts the completion of the acquisition campaign on the entire network, possibly causing the stoppage thereof.

Also, when a cable cut occurs, in practice, an attempt is made to detect and locate the cut without delay so as to be able to remedy same. This is not always easy depending on the terrains whereon the network is rolled out (some campaigns may be performed in mountainous regions, tropical forests, etc.).

With respect to power supply, it is noted that powering units in a unidirectional or bidirectional manner via modules is known.

The advantage of powering the units in a unidirectional manner is the simplicity of the implementation thereof: the voltage is propagated from the central processing unit to the modules followed by the units, followed by the following modules, etc. The drawback of this implementation is that a cable cut implies a shutdown of the power supply of the units situated after the cut to the next module.

On the other hand, a bidirectional power supply enables power supply redundancy: a power outage in one direction may be compensated by power supply continuity from the adjacent module.

To overcome the problem of cable cuts and the effects thereof, it has been proposed to organize the acquisition network in acquisition lines connected to the central processing unit by a main (cabled) communication line but also interconnected by secondary (also cabled) communication means forming a kind of mesh forming alternative paths in the event of a cable cut. However, this solution does not remedy all cable cut scenarios and tends to increase network installation times and costs considerably.

Replacing the cabled unit interconnection network by a radio network has also been proposed by the prior art, so that the end system is a sensor system without any connection cable.

However, this solution proves to be very dissuasive in technical and economical terms due to the very high throughput of data to be processed, requiring complex and very costly suitable equipment.

Furthermore, some terrains are not suitable for satisfactory radio communication, rendering the implementation of such a solution impossible.

The aim of the invention is particularly that of remedying the drawbacks of the prior art.

More specifically, the aim of the invention is that of proposing a seismic data acquisition system comprising a cabled network connected to a central processing unit which remains operational in the event of a cable cut.

A further aim of the invention is that of providing such a system enabling easy control, using the central processing unit, of the sections isolated by a cable cut.

These aims and further aims which will emerge hereinafter are achieved using a seismic data acquisition system comprising:
  a central processing unit;
  a cabled network connected to the central processing unit comprising a plurality of acquisition lines each comprising:
    electronic units assembled in series along a telemetry cable and each associated with at least one seismic sensor, the units processing signals transmitted by the sensor(s);
    intermediate modules assembled in series along the telemetry cable and each associated with at least one of the electronic units, each intermediate module providing power supply and synchronization of the electronic unit(s) wherewith it is associated.

According to the invention, each electronic unit is associated with at least two intermediate modules including at least one upstream and at least one downstream from the electronic unit along the telemetry cable, each intermediate module comprising:
  autonomous synchronization means independent from the central processing unit;
  bidirectional and autonomous power supply means so as to power at least one unit upstream from the intermediate module and/or at least one unit downstream from the intermediate module;
  means for storing the signals processed by the electronic units, the storage means being bidirectional so as to store the signals from at least one unit upstream from the intermediate module and/or at least one unit downstream from the intermediate module or the other of the two modules.

In this way, by means of the invention, the data acquisition network remains operational in the event of a cable cut.

Indeed, following a cable cut, the operation of the section of cable isolated from the central processing unit continues by means of:
  the synchronization performed by the isolated modules, which is autonomous and independent from the central processing unit;
  the power supply of the units supplied by each of the modules;
  local storage, on each of the modules, of the seismic data.

Furthermore, in a normal operating situation, the units are associated, by default, along the telemetry cable, with a predefined module, adjacent to the unit (particularly with respect to data storage and synchronisation): the module (n−1) is associated with the unit(s) (n+1), the module (n) is associated with the unit(s) (n), the module (n+1) is associated with the unit(s) (n+1), etc.

However, in the event of a cable cut, a unit n may be isolated from the associated module n.

The invention also makes it possible to remedy this situation: the bidirectional power supply means and the bidirectional storage means of each of the modules make it possible to connect the unit(s) (n) (isolated from the module (n) thereof) to the module (n+1), or the module (n+1) according to the position of the cut.

Preferentially, the synchronization means are bidirectional so as to synchronize at least one unit upstream from the intermediate module and/or at least one unit downstream from the intermediate module.

Advantageously, each unit comprises means for detecting a link with an intermediate module positioned upstream or downstream from the unit. In this case, the detection means are preferentially associated with the storage means of two intermediate modules.

The unit(s) of an isolated section may thus be automatically connected with a different module to that wherewith they are associated by default, or kept connected with the module wherewith they are associated by default, according to the position of the cut in relation to the modules and units in question.

Preferentially, the synchronization means comprise a satellite global positioning system integrated in each intermediate module.

According to one advantageous solution, the synchronization means of the modules are configured to be able to communicate with each other.

In this way, if the GPS of the synchronization means of one module is defective, or if the GPS of the synchronization means of one module loses the satellite link, the corresponding module may be synchronized via the synchronization means of an adjacent module.

Advantageously, the system comprises secondary communication means between the modules and the central processing unit. In this case, the secondary communication means are radio means.

In the presence of secondary communication means, the modules advantageously comprise:
  means for indicating the remaining level of autonomy of the power supply means;
  means for indicating the storage capacity available.

In this way, an operator can obtain, using the central processing unit and via radio communication with the modules (subject to the terrain), data on the operating status of the modules: remaining battery level, memory available, the operator also optionally performing other functional tests on the modules, whether isolated from the cabled network or not.

According to a further advantageous feature, the intermediate modules comprise connection means to a portable unit independent from the cabled network.

The seismic data stored locally by the modules can thus be retrieved in two modes:
- either by the central processing unit, after restoring the communication (replacement or repair of the cut cable);
- or by an operator provided with a portable unit, which is moved from module to module to retrieve the data in the portable unit with a view to forwarding same to the central processing unit.

According to a further advantageous solution, the modules comprise means for executing an algorithm for switching the synchronization means and/or the power supply means and/or the storage means on/off.

It is noted that, in practice, the intermediate modules operate in passive mode, regardless of whether they are in normal operation or in the event of a cut: by default, they power, store and synchronize continuously in a bidirectional manner. As a result, the units are in turn powered and synchronized by default in a bidirectional manner (by two modules, one upstream, the other downstream from a unit in question) and send the data to be stored to the upstream module or to the downstream module depending on the availability of the module; and, in the event of a cut in one direction, a unit is no longer associated with a single module, solely due to the cut in the cabled link.

Furthermore, the algorithm for switching the synchronization, power supply and storage means on/off is used to stop the campaign in the evening for example and resume same the following morning.

This algorithm is activated by the modules themselves and makes it possible to save power supply and storage means.

According to one particular embodiment, the modules are integrated with the units.

Optimized integration of the functions of the invention is thus obtained on the units, particularly facilitating the storage and rollout of the cabled network.

In another embodiment, the invention provides a module adapted to operate in a seismic data acquisition system wherein the seismic data acquisition system includes:
- a cabled network with a plurality of acquisition lines, each line having electronic units assembled in series along a telemetry cable, wherein each electronic unit is associated with at least one seismic sensor in which the electronic units process signals transmitted by the sensor(s).

The module is designed to be associated with at least one of the electronic units to provide power supply and synchronization to the electronic unit(s). The module comprises:
- autonomous synchronization means;
- bidirectional and autonomous power supply means so as to power at least one electronic unit upstream from the module and/or at least one electronic unit downstream from the module; and
- means for storing and processing the signals processed by the electronic units, the storage means being bidirectional so as to store the signals from at least one electronic unit upstream from the module and/or at least one electronic unit downstream from the module.

In one embodiment, the module houses at least two line ports on which electronic units or other modules can be connected. In another embodiment, the module includes at least one transverse port for a connection to a high speed link between the module and the central unit. In one embodiment, the module is operably connected to an external storage device. In one embodiment, the module is operably connected to a transmission means, such as a radio or a laser.

In another embodiment, the module is connected to a central unit, for example, through a network of intermediate modules, electronic units, cables or other high speed links. The electronic links can be in acquisition mode, test mode or in low power mode. The module can include a power supply that originates from one, two or more batteries operably connected to the module. In one embodiment, the module sends synchronization signals to electronic units and modules through one or more communication ports. In one embodiment, the electronic units receive synchronization signals from one or more line ports to provide seismic data at requested sample times.

In one embodiment, the module includes an internal memory. In another embodiment, the module includes an external storage device. In another embodiment, the module is operably connected to a low data rate radio.

The invention also includes a seismic data acquisition system that includes a module designed to be associated with at least one of the electronic units to provide power supply and synchronization to the electronic unit(s), wherein the module comprises: autonomous synchronization means; bidirectional and autonomous power supply means so as to power at least one electronic unit upstream from the module and/or at least one electronic unit downstream from the module; and means for storing and processing the signals processed by the electronic units, the storage means being bidirectional so as to store the signals from at least one electronic unit upstream from the module and/or at least one electronic unit downstream from the module.

Other features and advantages of the invention will emerge more clearly on reading the following description of a preferential embodiment of the invention, given as an illustrative and non-limitative example, and the appended figures.

DETAILED DESCRIPTION

As described above, the principle of the invention lies in the association, in a seismic data acquisition system comprising a cabled network connected to a central processing unit, of each electronic unit with two intermediate modules situated on either side of the unit along the cable, and the integration in the modules of autonomous synchronization means independent from the central processing unit, bidirectional and autonomous power supply means and bidirectional storage means of the signals processed by the units, each intermediate module optionally, according to the status of the cabled link, placing the synchronization, power supply and storage means thereof at the service of a downstream and/or upstream unit in relation to the module in question.

Figure 1:
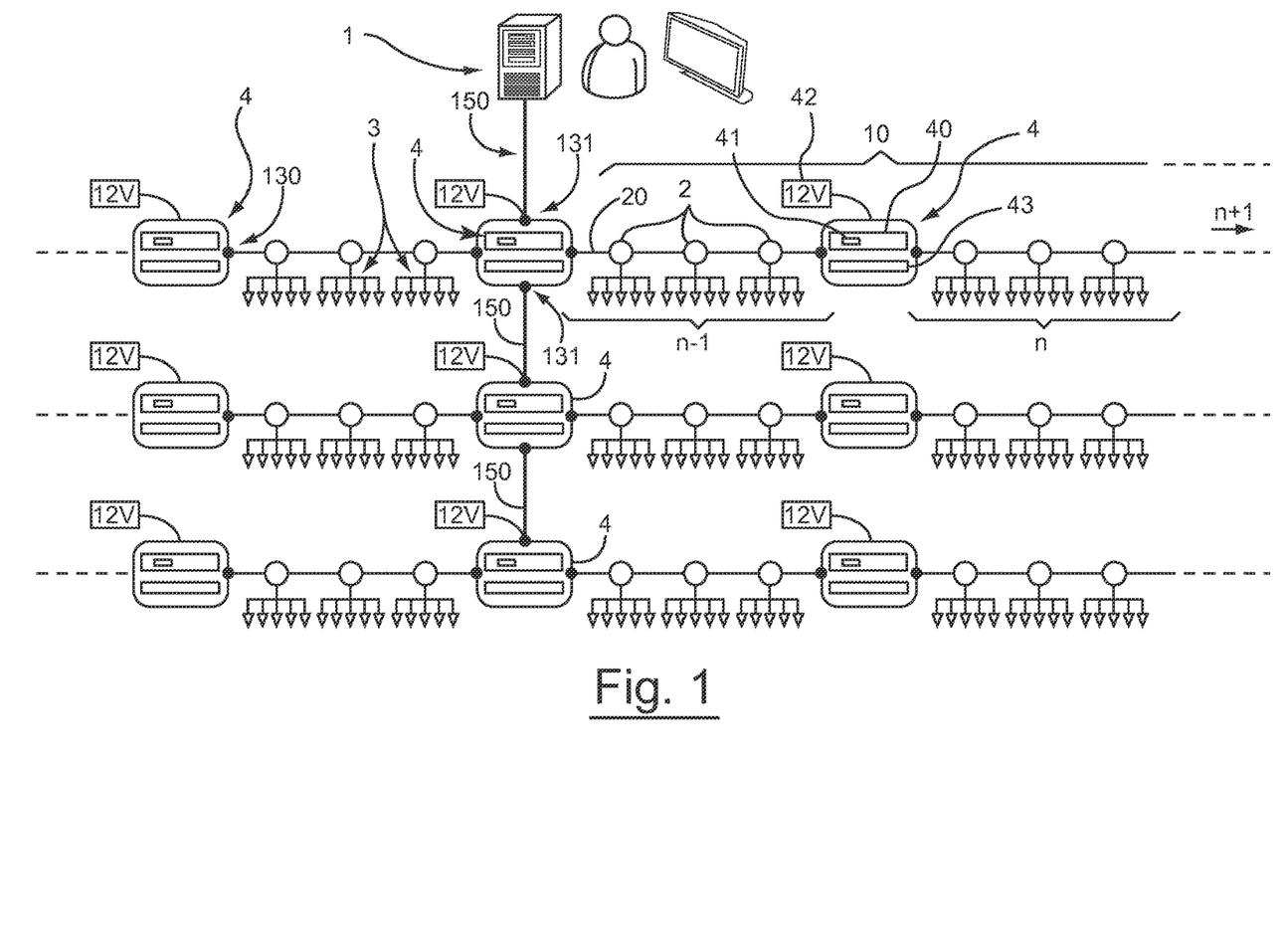
FIG. 1 illustrates schematically a seismic data acquisition system according to the invention, in normal acquisition mode.

With reference to FIG. 1, a seismic data acquisition system according to the invention comprises:
- a central processing unit 1;
- a cabled network connected to the central processing unit 1 comprising a plurality of acquisition lines 10. Each acquisition line 10 comprises:
  - electronic units 2 assembled in series along a telemetry cable 20 and each associated with at least one string 3 of seismic sensors (in this instance geophones);
  - intermediate modules 4 assembled in series along the telemetry cable 20 and each coupled with one or a plurality of electronic units 2 (three electronic units according to this embodiment).

Conventionally, the units 2 process signals transmitted by the sensors of the strings 3.

It is noted that the invention applies both to single-channel systems (wherein each unit is associated with a single string of geophones or a single accelerometer) and multi-channel systems (wherein each unit is associated with a plurality of independent strings of geophones or a plurality of accelerometers).

The intermediate modules each comprise:
- synchronization means 40;
- electrical power supply means 42, supplying a 12 V voltage for example.

The intermediate modules also perform signal processing and interfacing functions, not shown in FIG. 1, with the digital network (data transfer to the central processing unit, sending of commands received from the central processing unit to the units).

In a normal operation scenario, the units are associated, by default, along the telemetry cable, with a predefined module, adjacent to the unit: the module (n+1) is associated with the unit(s) (n+1), the module (n) is associated with the unit(s) (n), the module (n+1) is associated with the unit(s) (n+1), etc.

Also in a normal operation scenario, the power supply of the electronic units is supplied by each of the intermediate modules, and the intermediate modules n−1, n and n+1 perform the synchronization of the electronic unit(s) n−1, n and n+1, respectively.

It is noted that, in practice, each unit is supplied continuously with electricity by two intermediate modules (the upstream module and the downstream module in relation to the unit).

Furthermore, the synchronization of each unit may also be duplicated in normal operation, being carried out continuously by the upstream module and the downstream module in relation to the unit.

According to the principle of the invention, the synchronization, power supply and storage means of each intermediate module may be used for one or a plurality of electronic units positioned directly downstream (or upstream) from the module but also for one or a plurality of electronic units positioned directly upstream (or directly downstream, respectively) from the module.

For this purpose, the power supply means of each intermediate module are autonomous and bidirectional so as to power either the electronic units positioned directly upstream from the module, or the electronic units positioned directly downstream from the module, or both.

Furthermore, the synchronization means 40 of each module are autonomous and independent from the central unit, making it possible to continue the synchronization of all the electronic units, via the modules, even in the event of a cable cut.

According to the present embodiment, the synchronization means comprise a satellite global positioning system 41 (GPS) integrated in each intermediate module, the modules receiving a synchronization signal obtained using the GPS thereof or that of an adjacent module (the synchronization of the electronic units n optionally being performed by the synchronization means of the intermediate module n−1 (or n+1) in the event of the failure of the GPS of the module n, even in the absence of a cable cut).

According to the principle of the invention, each intermediate module further comprises storage means 43 of the signals processed by the electronic units.

The storage means 43 of each module are associated, by default, with one or a plurality of electronic units positioned downstream (or upstream) from the module, the storage means optionally performing the storage of signals supplied by the adjacent electronic unit(s) positioned directly upstream (or directly downstream respectively) from the module.

For this purpose, the storage means of each intermediate module are bidirectional so as to store the signals supplied either by the electronic units positioned directly upstream from the module, or by the electronic units positioned directly downstream from the module. In other words, the storage means of each module are connected to at least two electronic units including at least one upstream and/or at least one downstream from the intermediate module along the telemetry cable.

Furthermore, each electronic unit comprises means for detecting a link with an intermediate module positioned upstream or downstream from the unit, the detection means being associated with the storage means of two intermediate modules (one directly downstream and the other directly upstream from the corresponding unit).

The detection means comprise means for executing a dialog between the unit and the two modules upstream and downstream from the unit: the unit sends signals to both modules which each return a signal via the cable to the unit; signal return from the modules results in a detection of the cabled link with the corresponding module. Conversely, the lack of signal return from a module indicates a cable cut between the unit and the corresponding module, with the unit in this case sending the data from the sensor(s) to the module whereto it is still connected by the cable (particularly so that the data is stored by the storage means of the connected module).

Figure 2:
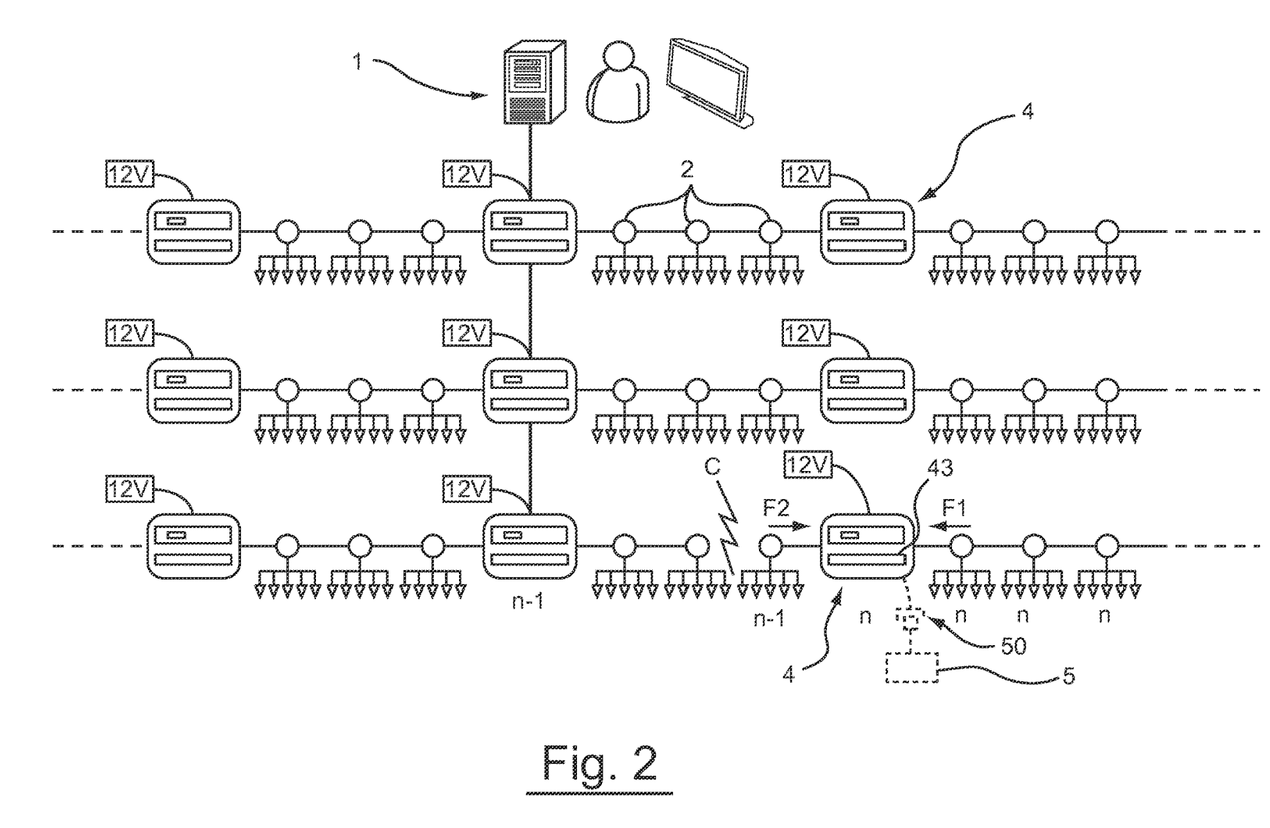
FIG. 2 illustrates schematically a seismic data acquisition system according to the invention, wherein a network section is isolated by a cable cut.

In this way, in the event of a cable cut C positioned between two units n−1 as illustrated by FIG. 2, one of the units n−1 is isolated from the associated module n−1. The detection means associated with the corresponding unit n−1 return to the unit a signal indicating that it is no longer connected to the intermediate module n−1, a link between the "isolated" unit n−1 and the intermediate module n being established such that:
- the intermediate module n provides the electrical power supply of the "isolated" unit n−1, in addition to providing the electrical power supply to the units n wherewith the module n is associated by default;
- the signals processed by the "isolated" unit n−1 are stored by the storage means 43 of the module n as represented by the arrow F2 (which further stores the signals processed by the units n as represented by the arrow F1);

the intermediate module n synchronizes the "isolated" unit n−1, in addition to synchronizing the units n wherewith the module n is associated by default.

Furthermore, the modules comprise means for executing an algorithm for switching the synchronization means and/or the electrical power supply means and/or the storage means on/off.

The intermediate modules automatically execute the algorithm for switching off (for example in the evening) and switching on (for example in the morning), for example at predefined times.

Since the synchronization means of the modules are autonomous and independent from the central processing unit, they continuously act on the units wherewith the modules are associated by default. According to the position of the cut, the synchronization means of a module will optionally synchronize additional units.

The download to the central processing unit 1 of the data stored by the modules downstream from a cut C is performed either via the telemetry cable once same has been repaired or replaced, or via a portable unit 5 carried by an operator and linked (the link may be of any type, cabled or wireless, known to those skilled in the art) with the modules (the operator transporting the portable unit along the entire portion of telemetry cable situated downstream from the cut) via connection means 50.

According to a further aspect of the invention, the modules comprise:
means for indicating the remaining level of autonomy of the power supply means;
means for indicating the storage capacity available.
means for indicating the GPS status, . . . .

Figure 3:
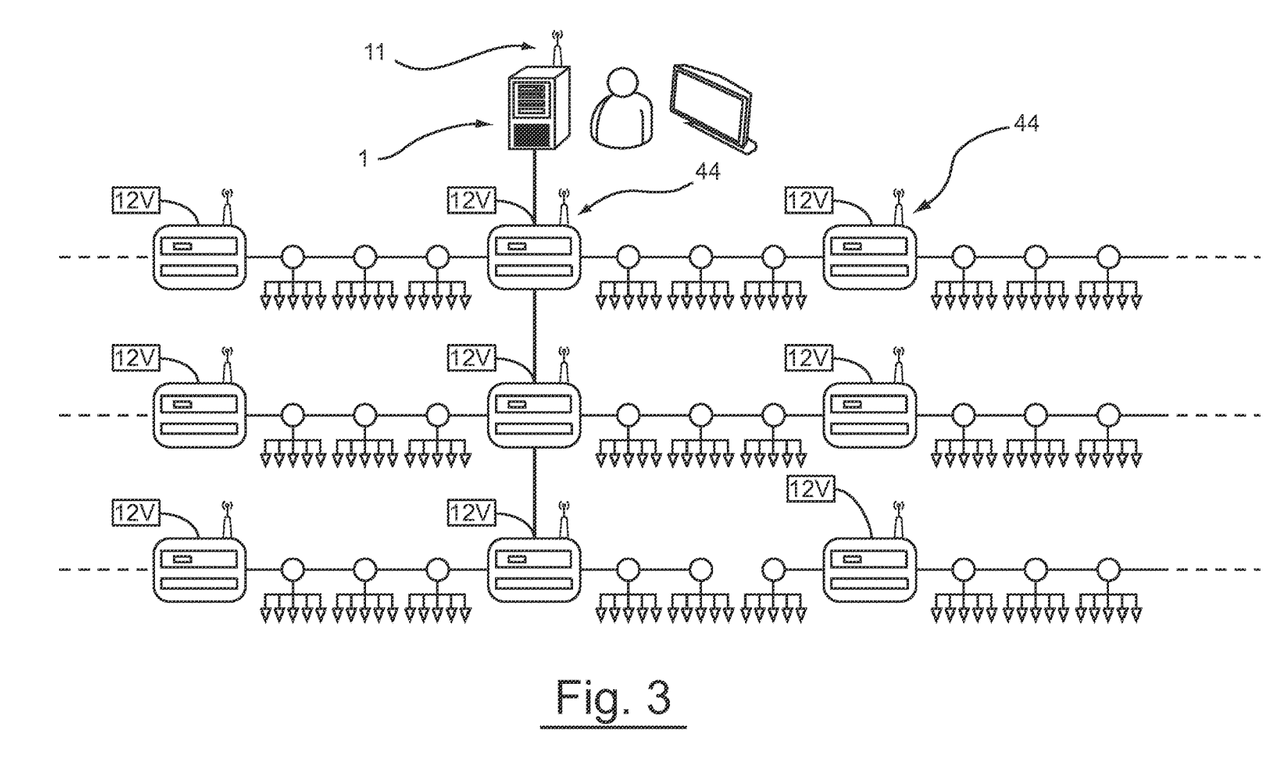
FIG. 3 illustrates a particular embodiment of the invention whereby the modules integrate secondary communication means.

The corresponding data (power supply means autonomy level, storage capacity available, GPS status, topology of units and modules, . . . ) may be transmitted to the central processing unit 1, either at a predefined frequency or at the request of the central processing unit. For this, with reference to the embodiment illustrated in FIG. 3, the central processing unit comprises radio transmission/reception means 11 and the intermediate modules comprise radio transmission/reception means 44. These radio transmission/reception means are preferentially a low data rate radio, activated when needed to send messages from the autonomous module to another module connected to the central unit through the network of electronic units and modules. Thanks to this new communication path, the autonomous module can also receive commands from the central unit.

Figure 4:
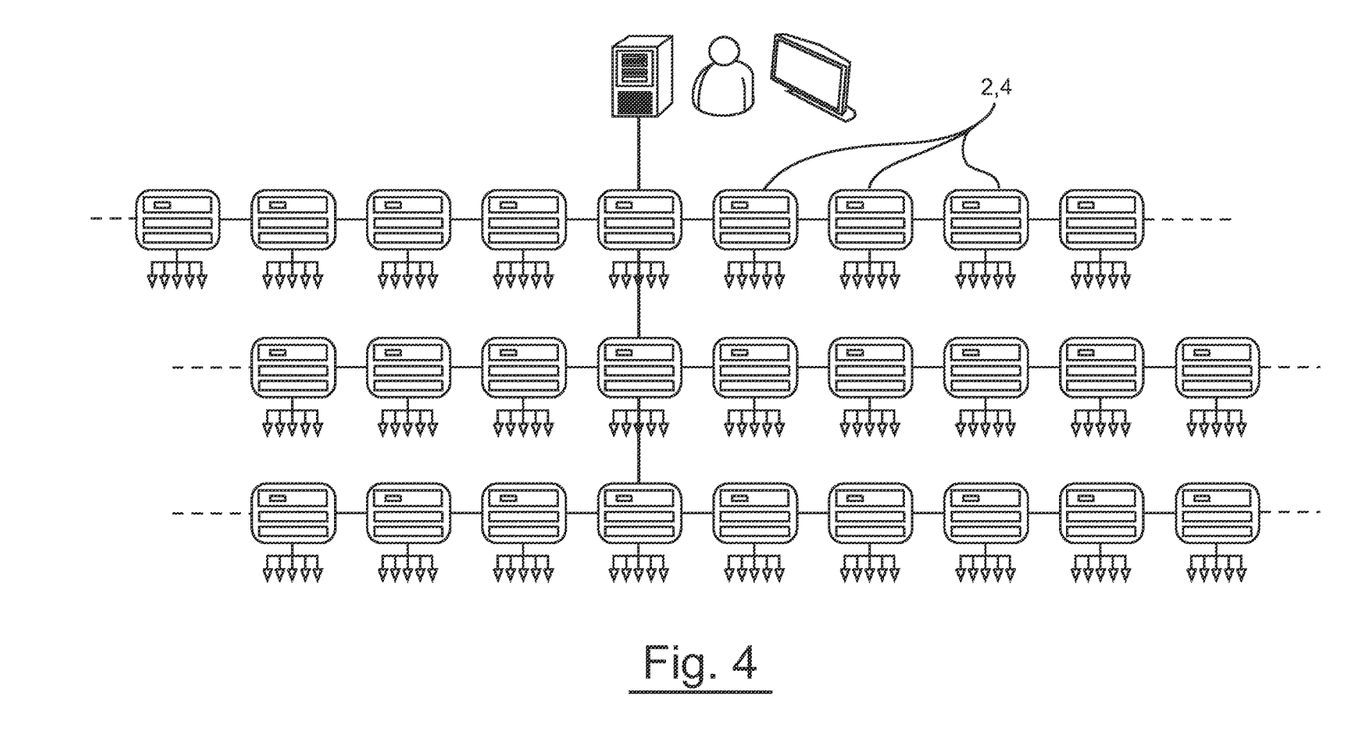
FIG. 4 illustrates a further particular embodiment of the invention whereby the modules are integrated in the electronic units.

It is noted that, according to the particular embodiment illustrated in FIG. 4, an intermediate module as described above is integrated with each electronic unit, to form a single component 2, 4.

In this type of configuration, it is noted that the power supply means may also be integrated directly in the modules.

Figure 5:
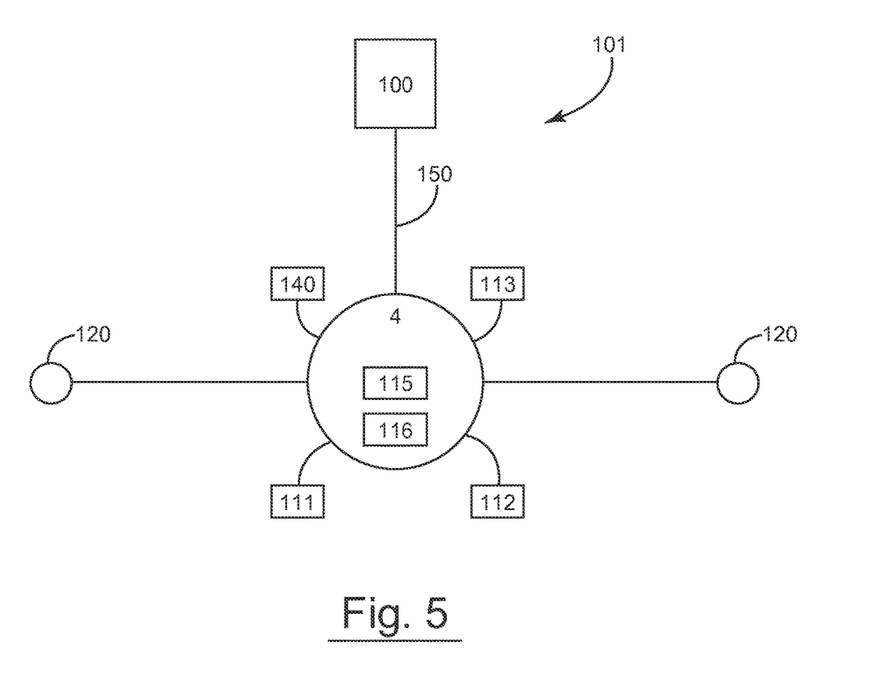
FIG. 5 is a simplified schematic of a seismic data system showing an intermediate module connected to an electronic link and a central unit.

In one embodiment shown schematically in FIGS. 1 and 5, the seismic data system 101 includes an intermediate module 4. In one embodiment, the intermediate module 4 houses at least two line ports 130 on which electronic links 2 or other intermediate modules 4 can be connected. For example, in some embodiments it may be possible to connect an "intermediate module" (which can also be referred to as a concentrator) with another "intermediate module" by a port line (e.g., bond port 130). However, in some embodiments it may not be possible to connect a unit "electronic module 2" on a transverse port 131. The electronic link 2 can house one, two or more line ports 130 on which other electronic links 2 or intermediate modules 4 can be connected.

In another embodiment, the intermediate module 4 includes at least one transverse port 131 in order to connect modules together and finally to the central processing unit to establish a high speed link. The transverse ports 131 provide a stronger communication flow between intermediate modules 4 and between them and the exchange links (represented by vertical lines in the figures). In one embodiment, an external storage device 111 can be operably connected to the intermediate module 4. In another embodiment, the intermediate module 4 can be connected to a transmission means 112, including, but not limited to, a radio or laser.

In one embodiment, the intermediate module 4 is connected to a central unit 100. In one embodiment, the intermediate module 4 is connected to the central unit 100 through a network of intermediate modules, electronic units, cables or other high speed links. When connected to the central unit 100, the intermediate module 4 receives commands from the central unit 100, executes these commands and sends status, data, or a combination thereof to the central unit 100. The intermediate module 4 sends commands to the electronic units and receives statuses, data, or a combination thereof from the electronic units 2. As such, the intermediate module 4 functions as an interface between the central unit 100 and the electronic units 2.

Depending on the command received from the central unit 100, electronic units 2 can be either in acquisition mode, in test mode, or in low power mode. From a collection of electronic units 2, some of them can be in acquisition mode, others in test mode, while still others are in low power mode. The existence of this type of heterogeneous mixture of modes in a collection of electronic units 2 was not previously possible.

In one embodiment, the power supply 113 for the intermediate module 4 can originate from one or two, or more batteries connected to the intermediate module 4. In one embodiment, the intermediate module 4 includes one or more power supply circuitries 113 which provide power to the electronic units 2 through line communication ports 130. In one embodiment, the electronic units 2 can receive power from one or more line communication ports 130. In one embodiment, the intermediate module 4 manages the synchronization of associated electronic units 2 and intermediate modules 4. In one embodiment, the synchronization source comes from an internal GPS 115, but may also come from another intermediate module 4 through one or more communication ports 130 or 131 in the event of GPS malfunction.

In one embodiment, the intermediate module 4 sends synchronization signals to connected electronic units 2 and intermediate modules 4 through one or more communication ports 130, 131 to enable the simultaneous acquisition of seismic data for multiple or all electronic units 2. In one embodiment, the electronic units 2 receive synchronization signals from one or more line ports 130 to provide seismic data at the requested sample times. In one embodiment, the data coming through the line ports 130 from the electronic units 2 controlled by a given intermediate module 4 can be stored in an internal memory 116 of the intermediate module 4. In another embodiment, the data coming through the line ports 130 from the notes controlled by a given intermediate module 4 can be stored in an external storage device 111. In a further embodiment, the data coming through the line ports 130 from the electronic units 2 controlled by a given intermediate module 4 can be stored in both an internal memory 116 and an external storage device 111. In one embodiment, the data is sent to the central unit 100 upon request by the central unit 100. In one embodiment, the electronic unit 2 sends its data to one intermediate module 4 at a time. If the intermediate module 4 is not reachable at any point, the data can then be sent to a different intermediate module 4.

When disconnected from the central unit 100, either due to a cable cut or if the intermediate module 4 is intentionally disconnected, the intermediate module 4 is autonomous in terms of power supply, synchronization and data storage. When disconnected from the central unit 100, the intermediate module 4 cannot receive commands from the central unit 100; the electronic units 2 can either be in test or acquisition mode depending on the setup of acquisition and test hours programmed in the intermediate module 4. The intermediate module 4 is able to transmit power to the electronic links 2 through line communication ports 130 and the electronic units are able to receive power from one or several of line communication ports 130. In the event of GPS malfunction, synchronization of the intermediate module 4 can originate from the internal GPS 115 or from another intermediate module 4. In one embodiment, the intermediate module 4 sends synchronization signals to connected electronic units 2 and intermediate modules 4 through one or more communication ports 130, 131. The electronic units 2 receive synchronization signals from either line port 130 to provide seismic data at the requested sample times. The data coming through the line ports 130 from electronic units 2 controlled by a given intermediate module 4 is stored in the intermediate module internal memory 116, in an external device 111 (if connected), or a combination thereof.

In the event that the intermediate module 4 becomes disconnected from the central unit 100, other optional communication means can be activated. For example a low data rate radio (which can also be referred to as a transmission mode 112) can be connected to the intermediate module 4 and activated when needed to send messages from the autonomous intermediate module 4 to another intermediate module 4 connected to the central unit 100 through the network of electronic links 2 and intermediate modules 4. These messages can contain information regarding the topology of electronic links 2 and intermediate modules 4, the battery level, the amount of memory available, the GPS status, . . . . The autonomous intermediate module 4 can also receive commands from the central unit 100 through the same path.

There are several ways of transferring the seismic data (and also test data, results, statuses, . . . ) from the intermediate module 4 to the central unit 100 for processing and storage. In one embodiment, a high speed link 150 between the intermediate module 4 and the central unit 100 allows the central unit 100 to request data to be transmitted from the intermediate module 4 to the central unit 100 through one or more high transverse principal 150 (i.e. the network of cables, electronic units, intermediate modules and others links (Radio, laser, . . . ). In another embodiment, the data in the intermediate module 4 or in the external data storage equipment 111 can be transferred to a harvesting tool 117 through an Ethernet connection 133 and then transferred from the harvesting tool 117 to the central unit 100.

If desired, the external data storage unit 111 can be disconnected from one intermediate module 4 and reconnected to another intermediate module 4 that is connected to the central unit such that the central unit 100 can request part or all the data to be transmitted from the external storage 111 to the central unit 100. Alternately, the autonomous intermediate module 4 can be transported and connected to the central unit 100 through the network of electronic units 2 and intermediate modules 4 such that the central unit 100 can request part or all the data to be transmitted from the intermediate module 4 to the central unit 100.

I claim:

1. First and second seismic modules configured to operate in a seismic data acquisition system, the first and second seismic modules being intercalated along an acquisition line with electronic units connected to seismic sensors, each of the first and second seismic modules comprising:
   a bidirectional time synchronization unit configured to send synchronization signals to electronic units of the seismic data acquisition system that are located upstream and downstream of the respective module along the acquisition line, wherein the bidirectional time synchronization unit is configured to operate autonomously;
   a bidirectional power supply configured to power up the electronic units located upstream and downstream of the respective module; and
   a bidirectional storage unit configured to store signals from the electronic units located upstream and downstream of the respective module,
   wherein a connection of each of the first and second seismic modules with both the electronic units located upstream and downstream defines a bidirectional relation,
   wherein the first seismic module is assigned to provide time synchronization, power and storage to a given electronic unit located upstream relative to the first seismic module, the given electronic unit being connected and located downstream to the second seismic module, and
   wherein the bidirectional relation ensures that the given electronic unit is synchronized, powered and supplied with storage capacity by the second seismic module when a connection of the given electronic unit to the first seismic module is lost.

2. The first and second seismic modules of claim 1, wherein each of the first and second seismic modules further comprises:
   first and second line ports, wherein the first port is connected to an upstream electronic unit and the second port is connected to a downstream electronic unit.

3. The first and second seismic modules of claim 2, wherein at least one of the first and second seismic modules further comprises:
   a third port configured to be connected to other seismic modules.

4. The first and second seismic modules of claim 2, wherein the first and second line ports are connected to the acquisition line.

5. The first and second seismic modules of claim 1, wherein at least one of the first and second seismic modules is connected to a central unit configured to collect the seismic data.

6. The first and second seismic modules of claim 1, wherein each of the first and second seismic modules is in one of an acquisition mode, a test mode, or in a low power mode.

7. The first and second seismic modules of claim 1, wherein the bidirectional time synchronization unit is a global positioning system unit.

8. The first and second seismic modules of claim 1, wherein the bidirectional time synchronization unit receives a synchronization signal from an adjacent seismic module.

9. The first and second seismic modules of claim 1, wherein the bidirectional time synchronization unit receives a synchronization signal from one or more line ports to provide seismic data at requested sample times.

10. The first and second seismic modules of claim 1, wherein the bidirectional power supply is a battery.

11. The first and second seismic modules of claim 1, wherein the bidirectional storage unit is an internal memory.

12. The first and second seismic modules of claim 1, wherein at least one of the first and second seismic modules further comprises:
a low data rate radio.

13. A seismic data acquisition system comprising:
plural acquisition lines;
plural electronic units distributed along the acquisition lines;
seismic sensors connected to the plural electronic units; and
first and second seismic modules intercalated with the seismic electronic units along one of the acquisition lines,
wherein each of the first and second seismic modules is connected in a bidirectional relation to one or more electronic units located upstream and one or more electronic units located downstream relative to the module, along the one of the acquisition line,
wherein the first seismic module is assigned to provide time synchronization, power and storage to a given electronic unit located upstream relative to the first seismic module, the given electronic unit being connected downstream relative to the second seismic module along the one of the plural acquisition lines,
wherein the bidirectional relation ensures that the given electronic unit is synchronized, powered and supplied with storage capacity by the second seismic module when a connection of the given electronic unit to the first seismic module is lost, and
wherein each of the first and second seismic modules includes a bidirectional time synchronization unit configured to send synchronization signals to the one or more electronic units located upstream and to the one or more electronic units located downstream, the bidirectional time synchronization unit being configured to operate autonomously.

14. The system of claim 13, wherein each of the first and the second seismic modules comprises:

a bidirectional power supply to power up the one or more electronic units located upstream and the one or more electronic units located downstream relative to the module; and
a bidirectional storage unit to store signals received from the one or more electronic units located upstream and the one or more electronic units located downstream relative to the module.

15. The system of claim 13, further comprising:
a central unit connected to the acquisition lines.

16. The system of claim 13, wherein each of the first and second seismic modules is in one of an acquisition mode, a test mode, or in a low power mode.

17. The system of claim 14, wherein the bidirectional time synchronization unit is a global positioning system unit.

18. The system of claim 14, wherein the bidirectional power supply is a battery.

19. A method for acquiring seismic data with electronic units that operate in a seismic data acquisition system, the method comprising:
connecting a first seismic module upstream from an electronic unit and a second module downstream from the electronic unit along an acquisition line;
sending synchronization signals from a bidirectional time synchronization unit of the first seismic module to the electronic unit, wherein the bidirectional time synchronization unit is configured to operate autonomously;
powering up the electronic unit from a bidirectional power supply of the first seismic module; and
storing signals from the electronic unit with a bidirectional storage unit of the first seismic module,
wherein, when a connection to the first seismic module is lost, the electronic unit is synchronized, powered and supplied with storage capacity by the second seismic module that also includes a bidirectional time synchronization unit which is configured to operate autonomously.

20. The method of claim 19, further comprising:
synchronizing, powering and providing data storage from the second seismic module only if the acquisition line has been partially severed.

* * * * *